United States Patent [19]
Menaker et al.

[11] Patent Number: 5,844,555
[45] Date of Patent: Dec. 1, 1998

[54] LOCKING MECHANISM FOR LIVE MATHEMATICAL DOCUMENTS

[75] Inventors: Samuel Menaker, Framingham; Michael Stout, Somerville, both of Mass.

[73] Assignee: Mathsoft, Inc., Cambridge, Mass.

[21] Appl. No.: 667,187

[22] Filed: Jun. 20, 1996

[51] Int. Cl.$^6$ .................................................. G06F 15/00
[52] U.S. Cl. ......................................................... 345/338
[58] Field of Search .................................. 345/333, 336, 345/337, 338, 339

[56] References Cited

U.S. PATENT DOCUMENTS

| | | | |
|---|---|---|---|
| 5,095,429 | 3/1992 | Harris et al. | 364/408 |
| 5,189,633 | 2/1993 | Bonadio | 364/709 |
| 5,276,607 | 1/1994 | Harris et al. | 364/401 |
| 5,285,400 | 2/1994 | Stent et al. | 364/709.04 |
| 5,339,388 | 8/1994 | Bates et al. | 395/153 |
| 5,339,389 | 8/1994 | Bates et al. | 395/153 |
| 5,416,895 | 5/1995 | Anderson et al. | 395/148 |
| 5,469,538 | 11/1995 | Razdow | 395/140 |
| 5,526,475 | 6/1996 | Razdow | 395/140 |

OTHER PUBLICATIONS

"MathSoft introduces Mathcad 6.0," *Business Wire, Math-Soft Inc.*, Jun. 9, 1995, 3 pages.

"MathSoft looks to Intert Access Feature to Mobilise Sales of Mathcad 6.0 for Windows Beyond Traditional Base," *Apt Data Services Ltd. Coputergram International*, Jun. 14, 1995, 2 pages.

Wingfield, Nick, "MathSoft adds E–mail, Internet links to Mathcad 6.0," *IDG Commnications, Inc. InfoWorld*, Jun. 19, 1995, 1 page.

Altidis, Paris C., "Mathcad 3.0: Fast, powerful, easy to use," *Design News*, May 18, 1992, p. 136.

Witten, Matthew, "MathCAD 3.1: A math–savvy whiteboard," *SUNWORLD*, Oct. 1992, p. 72.

Simon, Barry, "Mathcad 4.0: 32–Bit Power For Ultimate Math Scratch Pad," *PC Magazine*, Jun. 29, 1993, pp. 37–38.

"NASA Spinoff: 'Smart' Software For Fast Math," *NASA Tech Brief*, vol. 17, No. 9, Sep. 1993, p. 14.

Simon, Barry, "Mathcad Brings Numbers to Life," *PC Magazine*, Oct. 10, 1995, p. 51.

*Primary Examiner*—Phu K. Nguyen
*Attorney, Agent, or Firm*—Weingarten, Schurgin, Gagnebin & Hayes LLP

[57] ABSTRACT

A method and system for locking a defined portion of the live mathematical document. A live mathematical document program, executed on a computer processor, allows a user to edit a live mathematical document and also processes the document. The user can enter mathematical expressions in any position in the live mathematical document. The program automatically updates the live mathematical document to ensure that all expressions are consistent with all expressions upon which they depend. The user can position a first boundary line and a second boundary line in the live mathematical document. The program locks an area on the live mathematical document, the locked area being the area between the first boundary line and the second boundary line. An editor allows editing of expressions in the live mathematical document, and ascertains whether an edit is within the locked area and disallows such edits. Expressions, including expressions in the locked area, are automatically updated by the live mathematical document program to ensure that all expressions in the live mathematical document are consistent with all expressions upon which they depend.

27 Claims, 5 Drawing Sheets

$a := \sqrt{256}$        $a = 16$
$b := \log(e)$           $b = 0.434$
$c := -5 \cdot a$        $c = -80$ 🔒 Thu Jun 20 11:17:46 1996

$d := c + b$
$d = -79.566$
$f := 6$

🔒 Thu Jun 20 11:17:46 1996

$x := \dfrac{d}{3}$      $x = -26.522$ $y := f + (|d| \cdot 2)$   $y = 165.131$

FIG. 6

$a := \sqrt{256}$        $a = 16$
$b := \log(e)$           $b = 0.434$
$c := -2 \cdot a$        $c = 32$ 🔒 Thu Jun 20 11:17:46 1996

$d := c + b$
$d = 32.434$
$f := 6$

🔒 Thu Jun 20 11:17:46 1996

$x := \dfrac{d}{3}$      $x = 10.811$ $y := f + (|d| \cdot 2)$   $y = 70.869$

FIG. 7

$a := \sqrt{256}$     $a = 16$
$b := \log(e)$        $b = 0.434$
$c := -2 \cdot a$     $c = 32$ Thu Jun 20 11:17:46 1996

$d := c + b$
$d = 32.434$
$f := 6$

Thu Jun 20 11:17:46 1996

$x := \dfrac{d}{3}$     $x = 10.811$ $y := f + (|d| \cdot 3)$     $y = 103.303$

LOCKING MECHANISM FOR LIVE MATHEMATICAL DOCUMENTS

FIELD OF INVENTION

The present invention is directed to a method and apparatus for protecting user-specified portions of a live mathematical document from user modification, without affecting a user's ability to edit the unprotected portions of the document.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Mathematical document programs allow users to enter expressions and equations in worksheets and to calculate results. Sophisticated mathematical document programs such as the Mathcad Plus 5.0 program produced by Mathsoft, Inc. of Cambridge Mass., allow for the input of mathematical, scientific, and statistical expressions. These expressions can be entered "freeform" in any order and placed in any position in the worksheet (generally called a "document"). The Mathcad Plus 6.0 program also provides features for the input and/or creation of text, diagrams and graphs.

In the Mathcad Plus 5.0 program, the document on which the expressions are entered can be considered to be a virtual white board. The expressions are entered by a user on the white board (i.e., the open document displayed on the computer screen), using known graphical user interfaces, such as, for example, the user interface of Microsoft's Windows operating system. A document can be displayed, printed, edited, and saved as a file on a hard disk. A user can enter expressions on the document as if it were a sheet of paper, using common mathematical notations, rather than in the form of statements or equations used in programming languages or spreadsheets. The Mathcad Plus 5.0 program has an intelligent editor that interprets the expressions in the document. The intelligent editor can "understand" and interpret mathematical expressions as would a human mathematician, for example, by reading and interpreting a series of expressions in a document from left to right and from top to bottom.

The Mathcad Plus 5.0 program, released in January 1994, is fully described in "Mathcad Plus 5.0 User's Guide" available from Mathsoft, Inc., of Cambridge, Mass. The Mathcad Plus 5.0 User's Guide is expressly incorporated by reference herein.

A mathematical document that provides for automatic recalculation of related mathematical expressions in a document whenever an expression is edited, modified, added, deleted, or changed is known as a live document. A mathematical document in the Mathcad Plus 5.0 program is considered to be "live" when, if a change is made to a variable or an expression in a Mathcad Plus 5.0 document, all related expressions are also updated, in real-time. Live numeric and live symbolic functionality are described in U.S. Pat. Nos. 5,469,538 and 5,526,475, which are expressly incorporated herein by reference.

When creating and editing a live document, a user is able to input, for example, a function having a number of variables and based on changes to the variable values, the function is automatically recalculated and the updated value is displayed on the screen, without further user intervention. This is beneficial when there are a series of calculations that need to be performed over and over and the input to them varies. However, those portions of the mathematical document that are reused may accidentally be modified, thus adversely effecting the results of the calculations.

When a mathematical document is passed between users, the creator of the document may desire to protect portions of the document while allowing other portions to be edited by others. However, because existing live mathematical documents can be freely edited, the creator cannot be assured that subsequent users are using any portion of the document he or she created.

Existing mathematical document editors used for editing live mathematical documents do not allow portions of the live document to be protected while maintaining the advantages of being a live document. Accordingly, there is a need to protect a portion of a live mathematical document without limiting user editing to the rest of the document and at the same time ensuring that all portions of the document remain live.

SUMMARY OF THE INVENTION

The present invention provides a mechanism to allow users to lock areas of a live mathematical document to prevent unauthorized or accidental modification or deletion of the contents in the locked areas of the document.

A mathematical document program enables a user to input mathematical and scientific expressions, equations, functions, formulas and the like and can calculate and display any results thereof. Typically, the mathematical document program maintains dependencies between related expressions. For example, if a variable is defined and then later used in an equation, the mathematical document program "knows" the value of that variable.

Sophisticated mathematical document programs have editors that allow users to enter equations, expressions, functions and formulas in "freeform" at any position in the mathematical document.

A live mathematical document program will automatically recalculate the results of expressions, equations, functions, formulas and the like whenever an expression is edited, modified, added or deleted in the document. Thus, the results of all calculations will always be "up to date" taking into account changes made elsewhere in the live document. Live mathematical documents are fully described in U.S. Pat. Nos. 5,469,538 and 5,526,475, expressly incorporated herein by reference. An example of a sophisticated live mathematical document program is the Mathcad Plus 5.0 program. The present invention can operate in conjunction with or as an additional feature of live mathematical document programs, such as, for example, Mathcad Plus 5.0.

According to the present invention, an editor module allows a user to enter equations and the like into the mathematical document. The mathematical document is displayed in a window on a computer screen and can be edited by the user. For example, utilizing the editor module, a user can edit existing equations, and cut and paste (e.g., move) or delete equations or regions of the document. The mathematical document program interprets the equations entered by the user and will output the results in the mathematical document.

The present invention allows a user to lock user defined areas of the mathematical document. In the representative embodiment of the present invention, a lockable area is designated by two horizontal lines, called boundary lines or lock regions, that are displayed across the document. The two boundary lines mark the boundaries of the lockable area. The user can move each boundary line up or down to change the lockable area. For example, the user can "drag" a boundary line to a different location. Once the user has defined the lockable area by positioning the two boundary lines in the document, the user can lock that area. A user can lock the defined area by, for example, selecting a command from a menu bar. When locking the defined area, the user is given the option of setting a password for that locked area.

Once an area has been locked, an icon signifying that the area has been locked is displayed. For example, an icon of a closed lock may be shown on each on the boundary lines. Additionally, the time and date that the area was locked can be displayed on or near each of the boundary lines. Once the area is locked, the boundary lines mark the boundaries of the locked area.

The present invention allows a user to lock multiple areas in the document. In the representative embodiment, locked areas cannot overlap or be placed inside another locked area. However, it will be appreciated that other embodiments may allow hierarchical locking of areas of a document.

An area can be locked without a password. Locking without a password is useful if the user wants to prevent accidental or absent-minded changing of an area of the mathematical document. When an area is locked without a password, anyone can unlock that area. An area can be unlocked, for example, by selecting the area or a boundary line and choosing the appropriate command from the menu bar. An area that is locked with a password cannot be unlocked unless the correct password is provided.

Equations in a locked area cannot be deleted, moved or modified. However, a user can copy equations that are in a locked area to a non-locked area of the document. (The original equations in the locked area that were copied are not deleted in the copying process.) Any changes to equations outside the locked area can, however, affect information in the locked area. For example, if the variable x is defined as the value "four" and an equation in the locked area below this definition of x was "x+3=" then the result output by the program in the locked area will be "seven" (i.e., the output will be shown as "x+3=7"). As the definition of x is not in a locked area, it may be changed by the user, e.g., x may be redefined to be "six". Thus, because of the live document capabilities of the present invention, the expression "x+3=" in the locked area will automatically be updated by the program to display the new correct output, i.e. "x+3=9". Accordingly, a user may not edit material in the locked area, but changes outside the locked area may cause the program to update information shown in the locked area.

As a security feature, when a document comprising a locked area is saved to disk, the document is encrypted through compression.

Once a locked area is unlocked, a user may edit the material that was therein in the usual way and the boundary lines may be deleted.

It will be appreciated that material in the locked area may include expressions, equations, formula, functions, text, matrices, vectors, graphs, tables, animations, mathematical programs and the like, and other materials usually included in a live mathematical document.

The representative embodiment of the present invention uses horizontal lines to define a locked area. Other mechanisms can be used to define a locked area, such as boxes with x and y coordinates, vertical lines, etc.

The locking features of the present invention are particularly useful if an equation or set of equations are to be used over and over. Thus, the equations can be verified and then locked so that the equations can be reused with the assurance that they have not been modified.

BRIEF DESCRIPTION OF THE DRAWINGS

FIGS. 6, 7, and 8 present an illustration of the operation of the locking system of the present invention in a "live" mathematical document.

DETAILED DESCRIPTION

Figure 1:
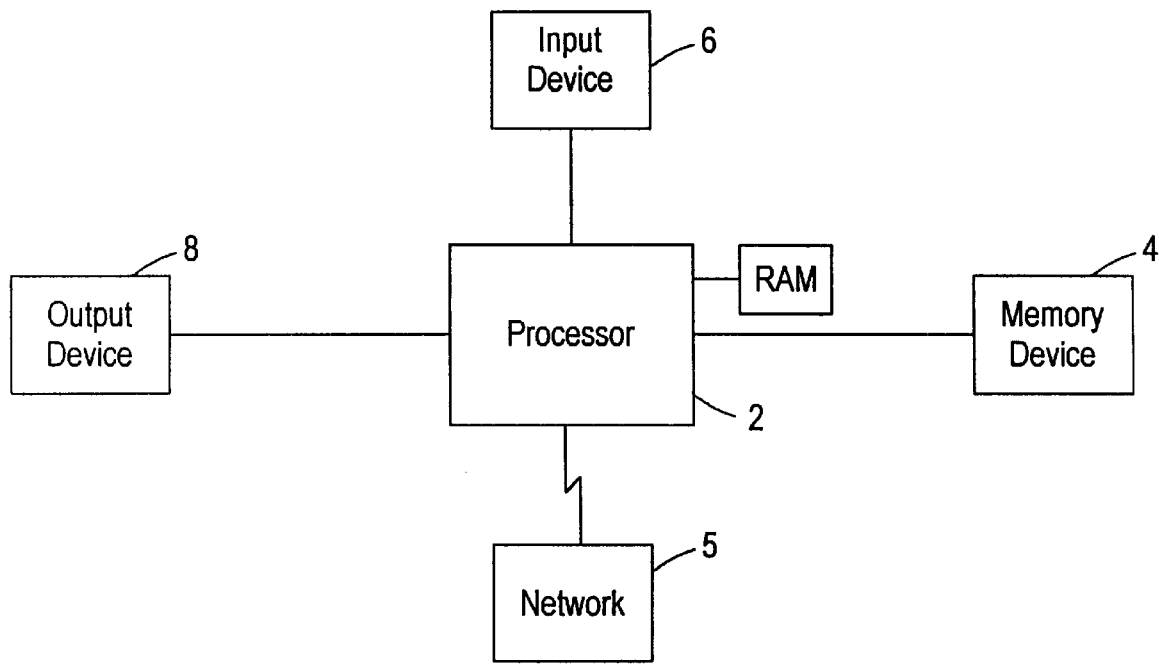
FIG. 1 is a block diagram of exemplary hardware that can be used in conjunction with the representative embodiment of the present invention.

Referring now to the drawings, and initially to FIG. 1, there is illustrated in block diagram form exemplary hardware that can be used in conjunction with the representative embodiment of the present invention. A processor 2, such as, for example, an IBM brand compatible personal computer with an Intel PENTIUM chip, is coupled to a memory device 4, such as a hard disk drive, that stores a computer program that is executed by the processor 2 to control and coordinate the apparatus and method of the present invention. Data that is manipulated by the processor 2, such as, for example, electronic documents that include mathematical expressions, can be stored in the memory device 4. Input devices 6, such as a keyboard and a mouse, are coupled to the processor 2. A user can enter, for example, data using the input device. Input can also be received from another processor. For example, the input to the present invention can be received over a network, such as the Internet. An output device 8, typically a computer monitor or CRT, is coupled to the processor 2, for displaying output, such as, for example, the electronic document the user is currently creating and editing. According to the present invention, the marked and locked regions of the document are made visible to the user and displayed on the output device 8.

Throughout this specification there are a number of terms used to describe the locking system of the present invention. This section explains the frequently used "locking" terms:

locked area: area of the document containing the protected data.

locked region: boundaries of a locked area.

locking: the operation of protecting a portion of an electronic document from edits.

region: physical space in electronic document that can be manipulated by the user (e.g., in an electronic document there may be text regions, equation regions, locked regions, etc.).

data, materials, information: these terms include, where appropriate, expressions, equations, formula, functions, text, matrices, vectors, graphs, tables, animations, mathematical programs and the like, and other materials usually included in a live mathematical document.

Figure 2:
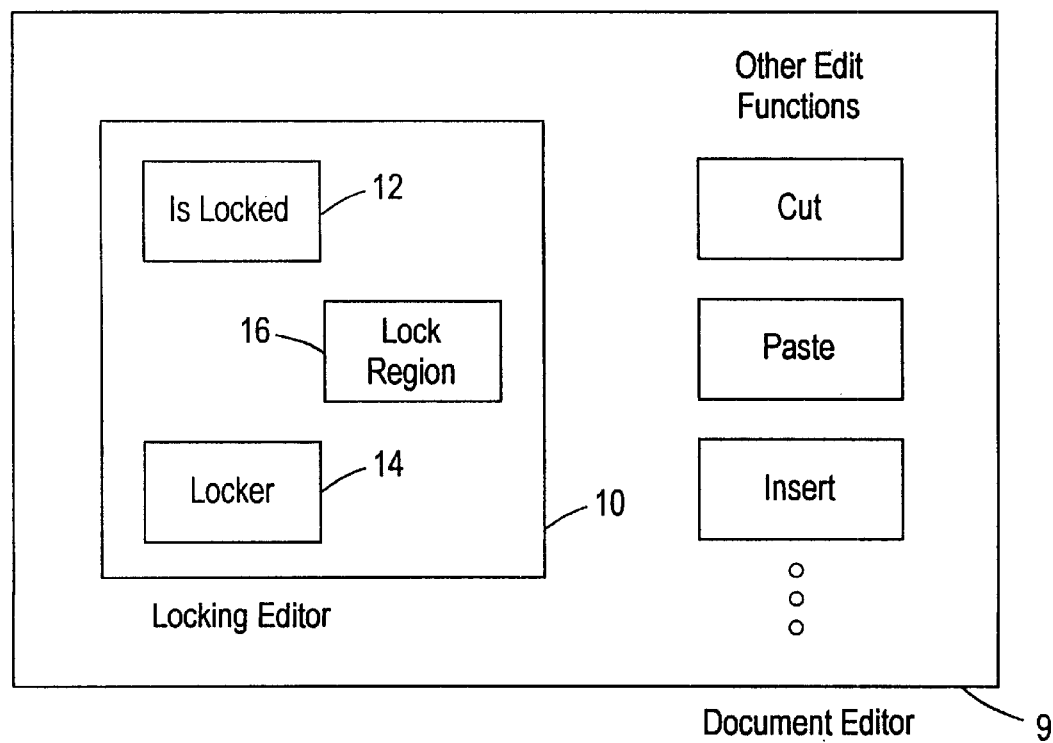
FIG. 2 is a diagram of the structure of certain modules used by the present invention.

Turning now to FIG. 2, there is illustrated in block diagram form the high-level components of the present invention. A document editor 9 allows a user to add, modify, and delete data. The document editor 9 comprises a series of modules that simplify the user's interaction with the software system. Examples of edit operations that are carried out by the document editor 9 include: cut, paste, copy, insert equation, insert operation, change name of variable, etc. Typically, a user enters an expression via the input device 6 using the capabilities of the document editor 9. The input is stored in memory and displayed on the output device 8. Users can normally edit the data in the document at will.

According to the present invention, the document editor 9 includes a locking editor module 10. The present invention acts as a block to at-will editing, thereby providing protection for user-specified portions of a document.

In the representative embodiment, the document editor 9 comprises three routines that work together to ensure the integrity of the information, both protected and not, input by the user. These modules are islocked 12, locker 14, and lock region 16. Islocked 12 ensures that editing functions do not modify data in a locked area. Locker 14 handles the process of locking an area. Lock region 16 allows a user to define the region to be locked.

For example, the user may initiate an action to lock an area by selecting the locking option from the edit menu. This will activate the lock region subroutine 16 which, in conjunction with locker 14, will mark and/or lock a specified area. Islocked 12 is called whenever the integrity of any data in the locked area is at stake. Therefore, islocked 12 will be called when the user attempts to edit the document. Whether the user will be allowed to proceed with an edit is determined by the value islocked 12 returns.

Marking An Area To Be Locked

In the representative embodiment, the user initiates a lock action. The user specifies which portion of the document is to be locked. In order to lock a portion of the document, both the locker 14 and lock region 16 modules are called. Islocked 12 is also called to ensure that the user is not attempting to re-lock a locked area.

More specifically, when a user initiates a request to lock an area of the document, lock region 16 processes that request. Lock region 16 first carries out initialization steps. Part of the initialization process for the lock region module 16 is to create two boundary lines (also called locked regions). Each boundary line has an associated data structure. The data structure for one boundary line includes a pointer to the other locked region (in the example code below, called myspouse.) In the representative embodiment, the boundary lines specify the beginning and ending points of the locked area and are mutually dependent on one another—one cannot effectively exist without the other. If one is deleted, its link to the other ensures deletion of both.

The user specifies the boundary points that will be used to denote the locked area. The present invention inserts a pair of boundary lines to mark the boundaries of the lockable area. If the lines are not where the user would like them to be, the boundary lines can be dragged at will as if they were any other region. The boundary lines should be positioned so there is enough space in between them for whatever data the user wants to lock.

The locking editor module 9 maintains a data structure called locker 24. Locker 24 is a list of elements, each element called a lockbox and defining one locked area. Each element of the locker 24 includes two pointers, one to each of the locked regions. Initialization of the locked areas via setting the pointers does not lock an area. It only marks an area to be locked. In more detail, locker 24 is a linked list specifying marked areas and that tracks which areas are locked or could be locked (lock flag 25), and includes a bit specifying whether the locked area is password protected or not (bit 30) and includes two pointers (27) one to each of the two lock regions.

Marking an area is the first step involved in the lock process. Once an area has been marked, the user can complete the process by choosing to lock the area. The locker module 14 implements the users lock selection.

A locked area is created as follows
1) User selects "create locked area" from, e.g., the menu
2) Program creates start lock and end lock regions
3) Program creates a lockbox by calling documentLocker::addLockedBox This returns a handle to a lockbox which is stored in the Lock regions 4) in lockbox, set pointers to the two lock regions calling DocumentLocker::setRegion
The first parameter is the handle to lockbox;
The second parameter is TRUE if it is a start lock;
The third parameter is the lock region.

setRegion not only updates the pointers in lockbox, but it ensures that the spouse pointers in the lock regions are set correctly.

```
void DocumentLocker::setRegion(handle handle, mcBool lock,
Lock *region)
{
  LockBox *lockbox = findLockBox(handle);  // find
lockbox given the handle
  if (lockbox) {
    lockbox->setLockRegion(lock, region);
    Lock *lockS = lockbox->getstartLock();
    Lock *lockE = lockbox->getEndLock();
    if (lockS && lockE) {
      lockbox- >getstartLock () ->setSpouse (lockE);
      lockbox- >getEndLock () - >setspouse (locks);
    }
    else
    {
         //error condition
    }
}
```

Locking

Once an area has been defined, that area can be locked. The locker module 14 controls the locking process.

Since only unlocked areas can be locked, the processor 2 calls islocked module 16 to ensure that the area to be locked is unlocked. If the region is locked then the subroutine locker 14 will not be activated and no area can be locked.

Locker 14 is a subroutine that handles the bulk of the locking process. It makes several calls to lock region 16 and interacts with and modifies the lock box 24. Overall, the function of locker 14 is to ensure that a specified area is properly locked. Locker 14 handles this function by carrying out a number of tasks which are outlined in detail below.

To lock an area
1) User selects "lock area"
2) Program calls DocumentLocker::lockArea(handle handle, String& password) psedocode:
set the lock bit in the lock box associated with the handle;
set the time stamp in the start and end lock regions by calling DocumentLocker::setStamp;
set the passwords in the lock regions by calling DocumentLocker::setPassword;
increment the password count which is used to determine whether the file needs to be encrypted.

setPassword works as follows
Program calls mcBool DocumentLocker::setPassword (handle handle, String& password) pseudocode:
    find the lockbox from the handle;
    set the password on the start and end lock;
    if the password is not empty then set the protect bit in start and end lock regions;
    set the protect and locked bit in lockbox.

```
*********************************************************/
mcBool DocumentLocker:: setPassword (handle handle, String&
string)
{
  LockBox *lockbox = findLockBox (handle);
  if (lockbox) {
    if (lockbox->getStartLock()) {
lockbox->getStartLock() ->setPassword(string);
      lockbox- >getStartLock () - >setLocked (TRUE);
    }
    if (lockbox->getEndLock()) {
      lockbox- >getEndLock () - >setPassword (string);
      lockbox- >getEndLock () - >setLocked (TRUE);
    }
    if (string == String("")) {
      if (lockbox->getStartLock())
lockbox- >getStartLock () - >setProtected (FALSE);
      if (lockbox->getEndLock() {
lockbox->getEndLock() ->setProtected(FALSE);
    }
    else {
      if (lockbox- >getstartLock ())
lockbox- >getStartLock () - >setProtected (TRUE);
      if (lockbox->getEndLock())
lockbox- >getEndLock () - >setProtected (TRUE);
    }
    return TRUE;
  }
  else
    return FALSE;
}
```

The locked region is assigned a time stamp. The locker module 14 is also responsible for this function. Locker 14 begins this task by initializing the date/time stamp as follows:
    get a time stamp from lock region 16;
    set a time stamp in the lock region 16.

One of the user input parameters regarding a locked area is whether that area is to be protected by a password. If the user does not enter a password, or enters a null one, the region is locked without a password. Passwords used to protect the locked areas of the present invention are encrypted and compressed according to a proprietary scheme. For additional protection, the whole of a document containing a password protected locked area can be encrypted when saved to further protect the data it contains. In the event a user forgets his or her password, a superuser password can be used to unlock a locked area. The initialization pseudocode associated with the locker 14 password protection feature is as follows:
    get a password from lock region 16;
    set region protections by activating a password in the begin 26, and end lock region 28 areas (see FIG. 3).

Once the date/time stamp and password have been ascertained, the locker routine sets the lock in the area as follows:
    set lock in lockbox;
    lock area with or without a password and set a time stamp.

A locked area is denoted as such by the appearance of a lock symbol and a date/time stamp on or near the boundary line shown on the document. When a marked area is locked, a flag 25 that keeps track of locked areas is set in lockbox.

There is no limit to the number of lockable or locked areas that may be contained in a single document. In the representative embodiment, a restriction is that one lockable area not be contained inside another.

Editing

Once an area has been locked, its contents can no longer be modified by a user. If an equation or expression is safely in a locked area, it cannot be edited. However, the locked area remains part of the "live" document and may be affected by changes above it in the document, and it may affect expressions appearing below it. Therefore, the contents of a locked area may automatically change based on changes elsewhere in the worksheet which affect calculations in the locked area, but its contents may not be changed by a user. For example, if a function is defined inside a locked area, the user will still be able to use that function outside of the locked area. The user will not be able to change that function if it is contained within the locked area. Similarly, a user cannot change variable definitions in the locked area, for example, that correspond to input values for a function. If a user would like to retain the ability to control input specifications, the definitions should be placed in an unlocked area.

If an area is marked and has not been locked, the user cannot, of course, unlock it.

A locked area cannot be deleted. Attempting to delete a locked area initiates a call to the islocked routine 12 which prohibits such action. Once an area is unlocked, the user is free to delete that region.

An area that has been marked lockable, but is not yet locked, can be edited as if it were any other area of the document. A marked but unlocked area has an entry in the lock box 24 list and has visible lock region boundary lines.

Islocked 12 prohibits other software routines, mainly those associated with editing the document, from interfering with data in the bounds of the locked area. It protects the integrity of the locked space. In carrying out its duties, the islocked routine 12 is called to ensure the main program is not interfering with the locked region. Each call to islocked 12 determines if the area in which the user is attempting to edit is locked. The islocked routine 12 thus prohibits the modification of any data contained within a locked area. Each affirmative call to the islocked 12 routine produces the same result—no action that has the effect of modifying anything within a locked region can be taken. Calls to the islocked 14 routine which do not effect the user's ability to modify the document will return a null result to the processor. Such a result signifies that the area is not locked and the user is free to perform modifications. Examples of when the islocked 12 module prohibits user action include the following:
    when a user initiates dragging a region inside of a locked area;
    when a user attempts intra or inter document dragging of a region into a locked area;
    when a user attempts to set the units of an equation inside a locked area;
    when a user attempts to align regions inside a locked area;
    when a user attempts to cut a region inside a locked area;
    when a user attempts to paste a region inside a locked area;
    when a user attempts to delete or insert when inside a locked area;
    when a user attempts to append a file while the cursor is in a locked area;
    When the cursor is in a locked area, keystrokes are intercepted and cease to function. In order to alert the user that they are in a locked area and cannot edit anything within its bounds, the cursor is grayed out and deactivated. Therefore, clicking in a locked area does nothing. The user is not provided with any of the normal options that are provided in an unlocked area. When a user "selects all" as a pull-down menu option, nothing inside the locked region is selected. All of these checks, which are controlled by function islocked 12, ensure that users will not be able to override the no-modification stipulation of the present invention.

Although islocked 12 prohibits a user from modifying any data contained in a locked area, it does not prohibit automatic updating of data contained in a locked area. Functions, equations, etc. that affect calculations in a locked area will maintain the same effect on a locked area as they would on an unlocked area. A locked area does not override the characteristics of and the advantages associated with having a live document. Thus, locking a region is a way of protecting a portion of the document from oneself or a third party.

Figure 3:
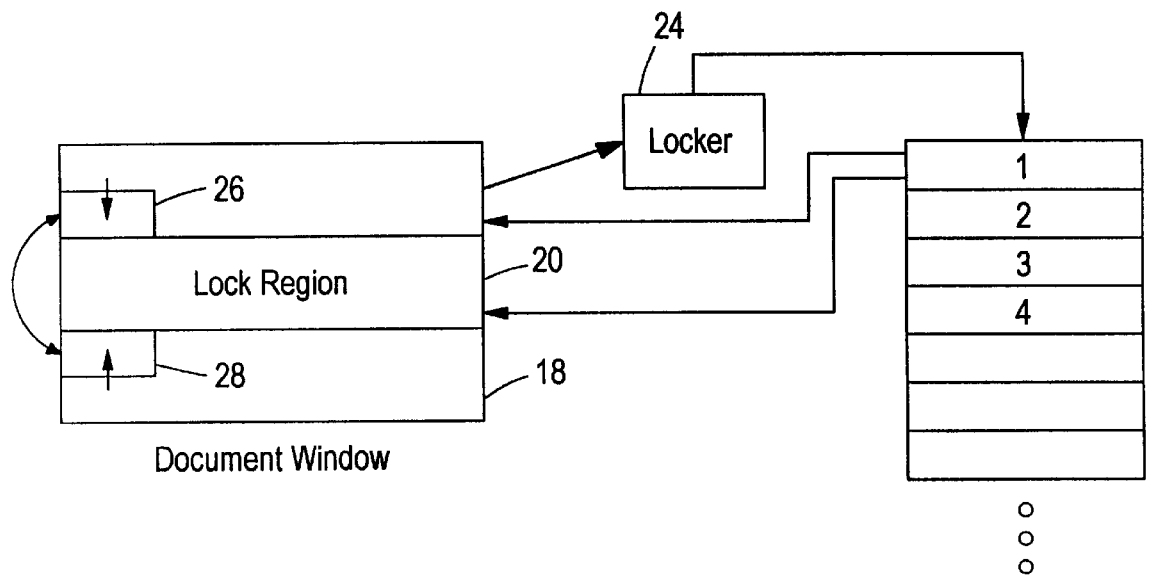
FIG. 3 is representation of a lockbox data structure of the present invention.
Figure 4:
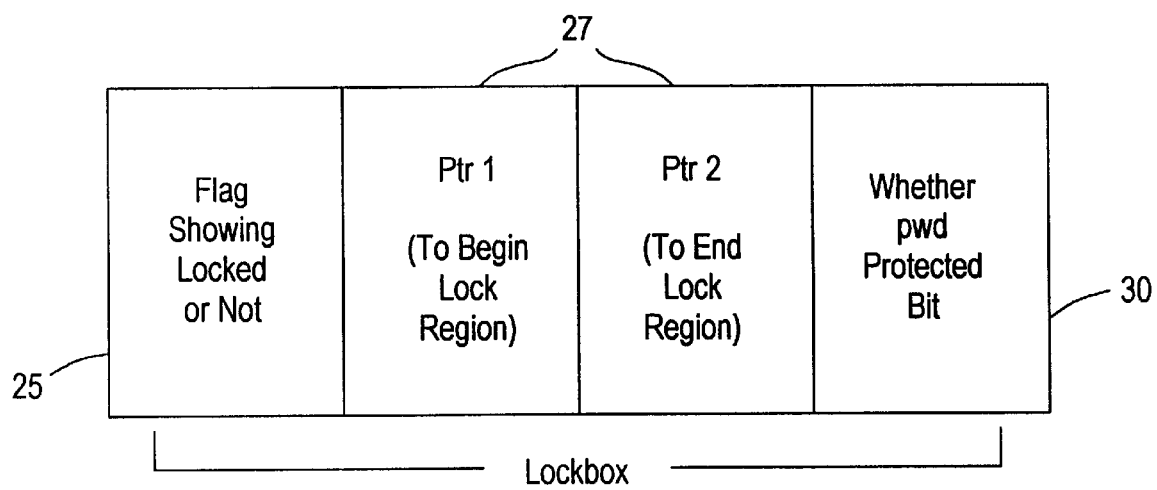
FIG. 4 is a structural representation of an entry in the lockbox of FIG. 3.

FIGS. 3 and 4 illustrate the data structures used by the present invention. FIG. 4 shows one lockbox, being an entry in locker 24. The locker routine 14 utilizes the locker 24. Locker 24 is a linked list that stores a list of the marked areas. It is initialized and maintained by the locker routine 14. Locker 24 can be of any length. For each marked, and therefore lockable, area, locker keeps track of whether the area is locked, if it is protected by password (30) and stores the pointers to lock regions 27. In summary, for each marked and therefore lockable area, a lockbox is created. A lockbox comprises pointers to the lock regions which define an area. A password is stored in the begin lock region along with a date/time stamp.

Each entry in locker 24 has at least two pointers 27, one to the begin locked region 26, and the other to the end locked region 28. Both begin locked region 26 and end locked region 28 are used to establish and maintain a locked area. Begin locked region 26 and end locked region 28 have pointers to one another. This ensures that if either region is deleted, its associated (spouse) region is also deleted.

In the representative embodiment, the space between begin locked region 26 and end locked region 28 is the locked area. The user specifies the begin and end lock region points. The begin locked region 26 is set to the point just to the left of (or above) where the user would like to begin the locked area. The end locked region 28 is set to the point just to the right of (or below) where the user would no longer like to end the locked area. The locked area will be visible to the user via the document window 18, which corresponds to the output device 8, and will be marked as a protected area. The present invention denotes the locked area by inserting visible lines that mark the boundaries. The lines have a lock symbol and a date stamp 30 that appear at both lock region boundary points.

If a user attempts to delete a locked region, if the locked region is unlocked, then the lockbox associated with the locked region is deleted and the spouse of the locked region is deleted.

If a request is made to unlock a locked area, locker 22 is activated to process the request. When unlocking a locked region, the locker 22 routine does the following:

verify password;
unlock region;
clear time stamp;
clear protections associated with region (e.g., password).

Although the number of marked areas can be infinite, once a user unlocks and chooses to delete a locked region, pointers 27, in the memory space (lock box 24) associated with that area are freed in order to maintain the efficiency and speed associated with smooth operation of the main system of which the present invention is a part.

Figure 5:
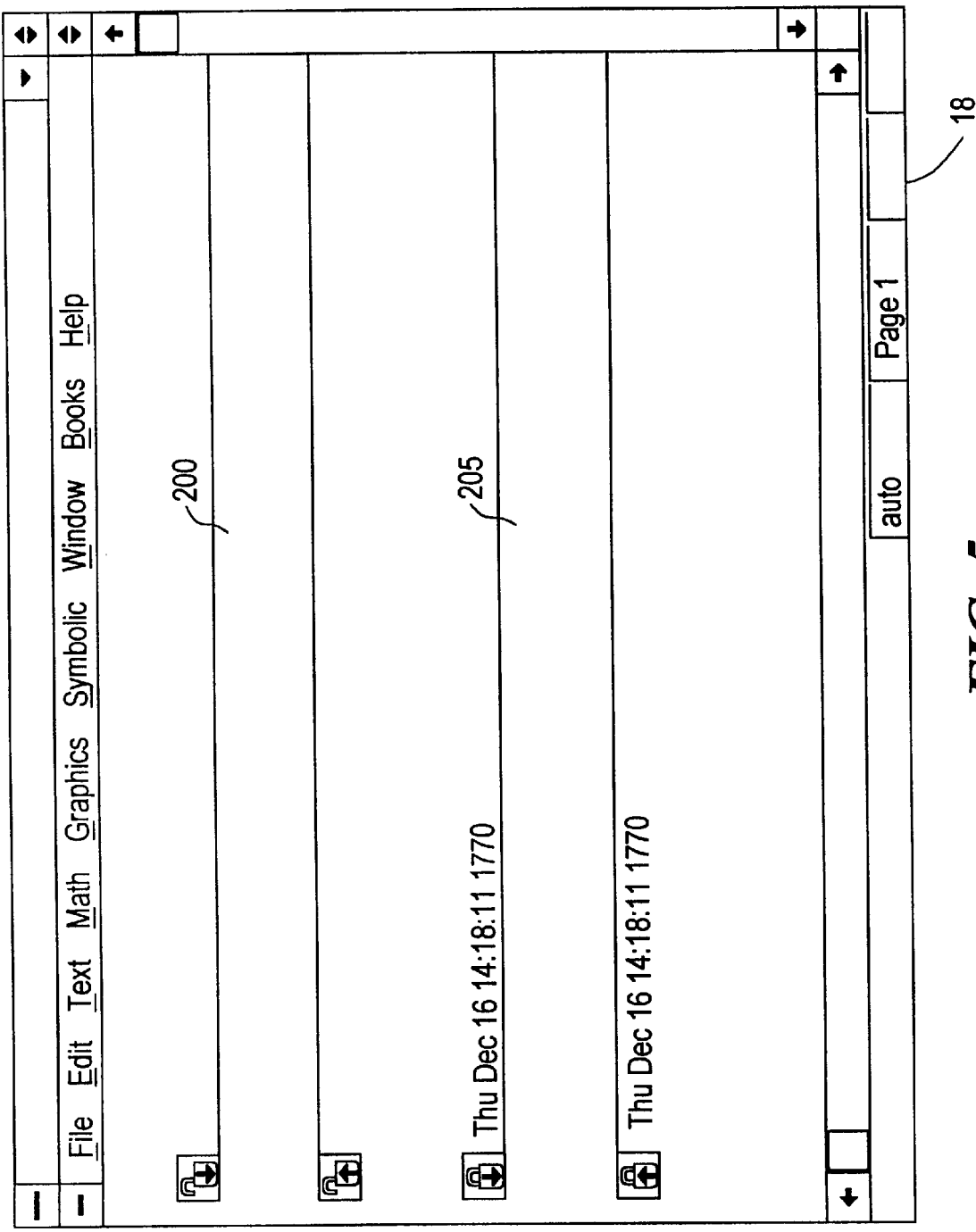
FIG. 5 is an example screen display showing the how lockable regions and locked regions can be displayed to the user.

FIGS. 5 and 6 illustrate screen displays of what the user views when an area of the document has been marked and/or locked. Both marked areas and locked areas are denoted in the document window 18, by lock symbols 28 and demarcation lines. The symbols are placed both at the beginning of the begin locked area 26 and after the end locked area 28. If an area is locked, then a date/time stamp 30 will be positioned next to the lock symbol. Thus, the user can easily tell which areas have been marked and are lockable and which areas are actually locked. A locked area 20 cannot be modified until it has unlocked.

It should be noted that in an alternative embodiment of the present invention, a locked area need not extend the entire parallel screen width. A locked area can be part of an equation, an entire equation, or another user-specified area.

FIG. 5 is an example screen display 18 showning two marked areas 200 and 205. Marked area 200 is unlocked. Marked area 205 is locked.

Figure 8:
Figure 8:

FIGS. 6, 7, and 8 present an example of the locking system of the present invention. In FIG. 7, a calculation above the locked area is changed. The change is reflected when equations both in and below the locked area are automatically calculated by the present invention. In FIG. 8, an equation below the locked area, which is dependent on a calculation in the locked area, is changed. The system accepts this change and uses the data in the locked area to automatically recalculate the equations located in the region below the locked area. However, the user cannot edit or change any data or material in the locked area.

The following is example code, written in C++, that can be used in the implementation of the present invention. LOCKREG.H and LOCKREG.CPP is the code used by the lock region module 16. The data structure "lock" defines a locker region. The pointer my_doc is a pointer to the document comprising the locker region. LOCKER.H and LOCKER.CPP is the code used by the locker module 14. The lockbox 24 data structure is defined therein.

21

```
/***********************************************
            LOCKER.H
***********************************************/ ifndef LOCKER_H
define LOCKER_H include "utlist.h"
include "strings.h"

class   Lock;
class   Password;
typedef int handle;
typedef String Timestamp;

const   int DO_LOCK = 1;
const   int DO_UNLOCK = 2;
const   int IGNORE_LOCK = 3;
const   int LOCK_GAP = 40;

class LockBox : public shpBox {
private:
        handle   boxhandle;
        bool     locked;
          bool     protection;
        Lock     *startregion;
        Lock     *endregion;
public:
        LockBox(shpPoint, shpPoint, handle);
        ~LockBox() {};
        LockBox&  operator=(const LockBox&);
        handle   getHandle() {return boxhandle;}
        bool     getLocked(bool);
        void     setLock(bool, bool);
        bool     getProtection(void){ return protection; }
        void     setProtection(bool prot){ protection = prot; }
        void     setLockRegion(bool lock, Lock *lockregion)
                {
```

```
                                          22
                        if (lock)
                              startregion = lockregion;
                        else
                              endregion = lockregion;
            }
      Lock    *getStartLock() { return startregion; }
      Lock    *getEndLock() { return endregion; }
};
class docDocument;
class DocumentLocker {
private:
      mc_List<LockBox *> listboxes;
      handle          handle_number;
      bool            passwordCount;
      docDocument *doc;
public:
      DocumentLocker() {handle_number = 0; passwordCount = 0;}
      void setDocument(docDocument *d) { doc = d;}
      ~DocumentLocker();
      LockBox   *isIn(shpPoint);
      bool    isLocked(shpPoint, bool);
      bool    isLocked(handle, bool);
      shpLogical isDown(shpPoint, bool);
      shpLogical isUp(shpPoint, bool);
      handle   addLockedBox(shpPoint, shpPoint);
      void     removeLockedBox(handle);
      handle   getCurrentHandle(void);
      bool     resizeLockedBox(handle, shpPoint, bool);
      bool     resizeLockedBox(Lock *);
      bool     lockArea(handle, String&, bool);
      bool     unlockArea(handle, String&);
      bool     setStamp(handle, String);
      Timestamp getStamp(handle);
      bool     setPassword(handle, String& );
      bool     setLock(handle, bool, bool);
      Password getPassword(handle);
      void     setRegion(handle , bool , Lock *);
      int      findLockIndex(handle);
      LockBox       *findLockBox(handle);
      LockBox       *findLockBox(shpPoint);
      int    canLock(shpPoint pt);
      void     incPasswordCount(void) { passwordCount++; }
      void     decPasswordCount(void) { passwordCount--; }
      bool     getSaveCompressed(void){ if (passwordCount == 0)
                                          return FALSE;
                                       else
                                          return TRUE;
                                  }
```

23

```
};
#endif

/****************************************************
        LOCKER.CPP
*****************************************************/ include "lockreg.h"
include <time.h>
// DocumentLocker code

/**************************************************** find the closest lockbox for given point
        under this point

*****************************************************/
shpLogical DocumentLocker::isUp(shpPoint pt, bool do_not_check)
{
        int        index = 0;
        shpLogical Min = 0;
        LockBox    *lockbox;

while( lockbox = listboxes.get_item(index) ) {
                if ((do_not_check || lockbox->getLocked(FALSE))
                        &&
                        pt.Y() <= lockbox->UL().Y()) {
                        if (Min == 0)
                                Min = lockbox->UL().Y();
                        else
                                Min = min(Min, lockbox->UL().Y());
                }
                index++;
        }
        return Min;
}

/**************************************************** find the closest lockbox for given point
        above this point

*****************************************************/
shpLogical DocumentLocker::isDown(shpPoint pt, bool do_not_check)
{
        int        index = 0;
        LockBox    *lockbox;
```

24

```
           shpLogical Max = 0;

while( lockbox = listboxes.get_item(index) ) {
                   if ((do_not_check || lockbox->getLocked(FALSE))
                           &&
                       pt.Y() >= lockbox->LR().Y()) {
                       if (Max == 0)
                               Max = lockbox->LR().Y();
                       else
                               Max = max(Max, lockbox->LR().Y());
                   }
                   index++;
           }
           return Max;
   }

/***************************************************** save a pointer for a lock region in lockbox
   *****************************************************/
   void DocumentLocker::setRegion(handle handle, bool lock, Lock *region)
   {
           LockBox    *lockbox = findLockBox(handle);
           if (lockbox) {
                   lockbox->setLockRegion(lock, region);
                   Lock *lockS = lockbox->getStartLock();
                   Lock *lockE = lockbox->getEndLock();
                   if (lockS && lockE) {
30                         lockbox->getStartLock()->setSpouse(lockE);
                           lockbox->getEndLock()->setSpouse(lockS);
                   }
           }
   }
35
   /***************************************************** get a time stamp from lock region

   *****************************************************/
   Timestamp DocumentLocker::getStamp(handle handle)
   {
           LockBox    *lockbox = findLockBox(handle);
           if (lockbox)
               return lockbox->getStartLock()->getTimeStamp();
           else
                   return "";
   }
```

```
/*****************************************************
        get a password from lock region

*****************************************************/
Password DocumentLocker::getPassword(handle handle)
{
        LockBox    *lockbox = findLockBox(handle);
        if (lockbox)
                return lockbox->getStartLock()->getPassword();
        else
                return (Password(String("")));
}

/***************************************************** set a time stamp in lock regions
        if stamp is already set, then return

*****************************************************/
bool DocumentLocker::setStamp(handle handle, String t)
{
        LockBox    *lockbox = findLockBox(handle);

if (lockbox) {
                if (!(t == String(""))) {
                  if (lockbox->getStartLock()
                      &&
                      lockbox->getStartLock()->getTimeStamp() == String(""))
                        lockbox->getStartLock()->setTimeStamp(t);
                  if (lockbox->getEndLock()
                      &&
                      lockbox->getEndLock()->getTimeStamp() == String(""))
                        lockbox->getEndLock()->setTimeStamp(t);
                }
                else {
                  if (lockbox->getStartLock())
                     lockbox->getStartLock()->setTimeStamp(t);
                  if (lockbox->getEndLock())
                     lockbox->getEndLock()->setTimeStamp(t);
                }
                return TRUE;
        }
        else
                return FALSE;
}
/*****************************************************
```

26

```
          set a password in start lock region
          and end lock region. Set region protections.

******************************************************/
     bool DocumentLocker::setPassword(handle handle, String& string)
     {
          LockBox      *lockbox = findLockBox(handle);

if (lockbox) {
10               if (lockbox->getStartLock()) {
                      lockbox->getStartLock()->setPassword(string);
                      lockbox->getStartLock()->setLocked(TRUE);
                 }
                 if (lockbox->getEndLock()) {
15                    lockbox->getEndLock()->setPassword(string);
                      lockbox->getEndLock()->setLocked(TRUE);
                 }
                 if (string == String("")) {
                      if (lockbox->getStartLock())
20                         lockbox->getStartLock()->setProtected(FALSE);
                      if (lockbox->getEndLock())
                           lockbox->getEndLock()->setProtected(FALSE);
                 }
                 else {
25                    if (lockbox->getStartLock())
                           lockbox->getStartLock()->setProtected(TRUE);
                      if (lockbox->getEndLock())
                           lockbox->getEndLock()->setProtected(TRUE);
                 }
30               return TRUE;
          }
          else
                 return FALSE;
     }
35
     /**************************************************** set lock in lockbox

     ****************************************************/
     bool DocumentLocker::setLock(handle handle, bool lock, bool protection)
     {
          LockBox      *lockbox = findLockBox(handle);

          if (lockbox) {
                 lockbox->setLock(lock, protection);
                 return TRUE;
          }
```

```
                            27
            else
                    return FALSE;
        }

       /***************************************************** lock area with password or without it
                set a time stamp

        *****************************************************/
        bool DocumentLocker::lockArea(handle handle, String& string, bool protection)
        {
                String  s("");
                time_t  *tp = new time_t;
                time_t  tm = time(tp);
                char    *t = ctime(tp);

*(t + strlen(t) - 1) = '\0';

                setLock(handle, LOCKED, protection);
                setStamp(handle, String(t));
                setPassword(handle, string);
                if (!(string == String("")))
                        incPasswordCount();
                delete tp;
                return TRUE;
        }

/*****************************************************
                unlock area, chaeck password, clear time stamp
                clear protections

*****************************************************/
        bool DocumentLocker::unlockArea(handle handle, String& string)
        {
                bool ret_status = FALSE;
                String  s("");
                Password password = Password(string);
        // check password
                if (password == getPassword(handle)) {
                        if (!(password == Password(s)))
                                decPasswordCount();
                        setLock(handle, UNLOCKED, UNLOCKED);
                        setPassword(handle, s);
                        setStamp(handle, String(""));
                        ret_status = TRUE;
                }
```

28

```
        // check superuser password
                else if (password == Password(String("***"))) {
                        if (!(password == Password(s)))
                                decPasswordCount();
                        setLock(handle, UNLOCKED, UNLOCKED);
                        setPassword(handle, s);
                        setStamp(handle, String(""));
                        ret_status = TRUE;
                }
        // if we unlocked area unlock lock regions
                if (ret_status) {
                        LockBox    *lockbox = findLockBox(handle);
                        lockbox->getStartLock()->setLocked(FALSE);
                        lockbox->getEndLock()->setLocked(FALSE);
                }
                return ret_status;
        }

/***************************************************** add lockbox

*****************************************************/
        handle DocumentLocker::addLockedBox(shpPoint pt1, shpPoint pt2)
        {
                handle_number++;

LockBox *lockbox = new LockBox(pt1, pt2, handle_number);

listboxes.add_item(lockbox);
                return handle_number;
        }

/***************************************************** find lock box index by using handle

*****************************************************/
        int     DocumentLocker::findLockIndex(handle handle)
        {
                int     index = 0;
                LockBox *lockbox;
                while( lockbox = listboxes.get_item(index) ) {
                        if (handle == lockbox->getHandle())
                                return index;
                        index++;
                }
                return NOBOX;
```

```
        }

/*****************************************************
            find lock box by using handle

*****************************************************/
        LockBox *DocumentLocker::findLockBox(handle handle)
        {
            int     index = 0;
            LockBox *lockbox;
            while( lockbox = listboxes.get_item(index) ) {
                if (handle == lockbox->getHandle())
                    return lockbox;
                index++;
            }
            return NULL;
        }

        /***************************************************** find lock box by using shpPoint

        *****************************************************/
        LockBox *DocumentLocker::findLockBox(shpPoint pt)
        {
            LockBox    *lockbox = 0;
            docRegion  *cur_rg;
            shpBox      bx(pt, pt, pt);

lockbox =
                doc->my_doclocker.isIn(bx.UL());
            if (!lockbox) {
                cur_rg = doc->locate(&bx, pt);
                if ( doc->region_type() == LOCKRGN) {
                lockbox =
                    doc->my_doclocker.
                    isIn(cur_rg->getBox().UL());
                if (!lockbox)
                    lockbox =
                        doc->my_doclocker.
                        isIn(cur_rg->getBox().LR());
                }
            }
            return lockbox;
        }
```

```
/*****************************************************
        ~DocumentLocker

*****************************************************/
DocumentLocker::~DocumentLocker()
{
}

/*****************************************************
        remove lock box

*****************************************************/
void DocumentLocker::removeLockedBox(handle handle)
{
        int     index;

index = findLockIndex(handle);
        if (index != NOBOX) {
            LockBox *lockbox = findLockBox(handle);
            if (lockbox)
                 delete lockbox;
            listboxes.remove_item(index);
        }
}

/*****************************************************
        get current handle in document locker

*****************************************************/
handle DocumentLocker::getCurrentHandle(void)
{
        return handle_number;
}

/*****************************************************
        check if point is in lock area

*****************************************************/
LockBox *DocumentLocker::isIn(shpPoint pt)
{
        int     index = 0;
        LockBox *lockbox;
```

```
                                    31
            while( lockbox = listboxes.get_item(index) ) {
                    if (pt.Y() >= lockbox->UL().Y()
                        &&
                        pt.Y() <= lockbox->LR().Y())
                            return lockbox;
                    index++;
            }
            return NULL;
    }
    /***************************************************** check if point is in lock area
            and lock area is locked (use point)
    *****************************************************/
    bool DocumentLocker::isLocked(shpPoint pt, bool is_protected)
    {
            LockBox *lockbox = DocumentLocker::isIn(pt);
            if (lockbox)
                    return lockbox->getLocked(is_protected);
            else
                    return UNLOCKED;
25  }

/***************************************************** check if point is in lock area
            and lock area is locked (use handle)

*****************************************************/
    bool DocumentLocker::isLocked(handle handle, bool is_protected)
    {
            LockBox *lockbox = findLockBox(handle);
            if (lockbox)
                    return lockbox->getLocked(is_protected);
            else
                    return UNLOCKED;
    }

/***************************************************** resize lock box
    *****************************************************/
    bool DocumentLocker::resizeLockedBox(handle handle, shpPoint pt, bool lock)
    {
```

```
                            32
        LockBox         *lockbox;

lockbox = findLockBox(handle);

        if (lockbox) {
                if (lock == STARTLOCK)
                        lockbox->UL(pt);
                else
                        lockbox->LR(pt);
                return TRUE;
        }
        else
                return FALSE;
    }
15
/***************************************************** resize lock box

    *****************************************************/
    bool DocumentLocker::resizeLockedBox(Lock *lock)
    {
        bool ret_status;

        if (lock->getWhatLock())
             ret_status = resizeLockedBox(lock->getHandle(),
             lock->getBox().LR(), lock->getWhatLock());
        else
             ret_status = resizeLockedBox(lock->getHandle(),
             lock->getBox().UL(), lock->getWhatLock());

return ret_status;
    }

    /***************************************************** check for actions at this point

*****************************************************/
    int DocumentLocker::canLock(shpPoint pt)
    {
        LockBox *lockbox;

lockbox = findLockBox(pt);
        if (lockbox) {
             if (!lockbox->getLocked(FALSE))
                        return DO_LOCK;
             else
```

```
                               33
                    return DO_UNLOCK;
              }
                else
                    return IGNORE_LOCK;
      }

// end of DocumentLocker

// Password code

/***************************************************** set a password

*****************************************************/
      Password::Password(String& string)
      {
              encodeString(string);
      }

/***************************************************** get a encoded string

*****************************************************/
      void Password::encodeString(String& string)
      {
              encodedString = string;
      }

/***************************************************** operator == for password

*****************************************************/
      Password&
      Password::operator=(const Password& password)
      {
              if (this == &password) return *this;
              encodedString = new char[strlen(password.encodedString) + 1];
              strcpy(encodedString, password.encodedString);
              return *this;
      }

/***************************************************** get a string from password
```

34

```
      /****************************************************/
      String Password::getEncodedString(void)
      {
              return encodedString;
      }

// end of Password

     // LockBox code

/**************************************************** create lock box
      ****************************************************/
      LockBox::LockBox(shpPoint pt1, shpPoint pt2, handle handle):
      shpBox(pt1, pt2, shpPoint(0, 0))
      {
              boxhandle = handle;
              protection = UNLOCKED;
              locked = UNLOCKED;
      }

     /**************************************************** operator == for lock box

****************************************************/
      LockBox&
      LockBox::operator=(const LockBox& lockbox)
      {
              if (this == &lockbox) return *this;
              boxhandle = lockbox.boxhandle;
              locked = lockbox.locked;
              return *this;
      }

/****************************************************
              operator == for lock box

****************************************************/
      bool LockBox::getLocked(bool check_protection)
      {
              bool ret = locked;
              if (locked)
                      if (check_protection)
```

```
                                    ret = protection;
                 return ret;
         }
  /*************************************************
             operator == for lock box

**************************************************/
  void LockBox::setLock(bool lock, bool prot)
  {
         protection = prot;
         locked = lock;

}
  /*************************************************
             code for a template

**************************************************/
  mc_List<LockBox*>&
  mc_List<LockBox*>::operator=(const mc_List<LockBox*>& ml)
  {
     if (this == &ml) return *this;
     my_size = ml.my_size;
     mc_ListItem<LockBox*> *ml_ptr = ml.my_front;
     LockBox *new_val;
     int i = 0;
     while (ml_ptr)
     {
        if (ml_ptr->my_item)
           new_val = new LockBox(*(ml_ptr->my_item));
        else
           new_val = 0;
        replace_item(new_val, i);
        ml_ptr = ml_ptr->my_next;
        i++;
     }
     return *this;
  }

// end of LockBox

/*******************************************
             LOCKREG.H
  ********************************************/
```

36

```
    #ifndef LOCKREG_H
    #define LOCKREG_H include "reg_att.h"
    #include "region.h"

const int STARTLOCK = 1;
    const int ENDLOCK = 0;
    const int LOCKED = 1;
    const int UNLOCKED = 0;
    const int NOBOX    = -1;
    const int NOHANDLE = -1;

typedef int  handle;
    typedef String Timestamp;

class docRegion;

class Password {
    private:
            String encodedString;
    public:
            Password() {encodedString = new char[1]; encodedString = 0;}
            Password(String&);
            ~Password() {};
            mcBool operator== (Password pass) {
                    return (pass.encodedString == encodedString);
            }
            Password& operator=(const Password&);
            void    encodeString(String&);
            String  getEncodedString(void);
    };

    class Lock : public docRegion
    {
    private:
       Password passwd;
       Timestamp timestamp;
       static const mcCharPtr myTypeTag;
       handle          myhandle;
       bool            protect;
       bool            lock;
       bool            locked;
       Lock            *my_spouse;
       bool            background;
       docDocument              *my_doc;
    public:
```

37

```
            void resync();
        Lock(shpBox *b, bool lock, docDocument *doc);
        Lock();
        ~Lock();
        void resize(shpBox) { } void show_main(mcGraphicsContext gc, int dm);

void clear(mcGraphicsContext gc);
        const int region_type() { return LOCKRGN; } const mcCharPtr getType() { return myTypeTag; }

        mcBool read(MCAD_FILE *, bool, bool&);
        bool read(char *) { return FALSE; } bool write_main(MCAD_FILE *, bool, bool&);
        void edit(mc_command_type, char *, shpPoint,
            int sel = DO_NOT_SELECT_TOP_NODE);
        shpBox pack(mcGraphicsContext) { return myBox; }
        void pack(mcGraphicsContext, const shpBox) { } handle getHandle() {return myhandle;}
        void setHandle(handle handle) {myhandle = handle;}
        bool getWhatLock() {return lock;}
        bool insert_for_handbook(MCAD_FILE *) {return TRUE ;};
        void copy_selected(){ };
        void paste(int format){ };
        void get_selection(char *, int){ };
        bool replace_selection(char *, char *, shpPoint&){return FALSE ;}
        bool is_ok_to_replace(shpPoint&, int, char *){return FALSE;}
        bool empty_region() { return FALSE; }

        void setBox(shpBox b)
        {
            myBox = b;
            win_document(curwin)->my_doclocker.resizeLockedBox(this);
        }
        Timestamp getTimeStamp(){return timestamp;}
        void setTimeStamp(String& string) { timestamp = string; }
        void setPassword(String& string);
        Password getPassword() { return passwd; }
        void setProtected(bool prot) {protect = prot;}
        bool getProtected() {return protect;}
        void setLocked(bool lock) {locked = lock;}
        bool getLocked() {return locked;}
        void setSpouse(Lock *lock) {my_spouse = lock;}
```

38

```
    Lock *getSpouse() {return my_spouse;}
    void setBackground(bool setb) {background = setb;}
    bool getBackground() {return background;}
    DisplayableBitmap *lockBitmap;
    bool what_bitmap;
    };

#endif

10
    /*******************************************************
            LOCKREG.CPP
    *******************************************************/

    #include "lockreg.h"
    #include "mc_debug.h"
    #include "di.h"
    #include "pgmodel.h"
   const mcCharPtr Lock::myTypeTag = "LOC";
    // size of LOCKRGN
    #define MAXL 8000
    FSTATIC int CharNum;

/******************************************************* set initial values in lock region
    *******************************************************/
    FSTATIC void initLock(Lock *lock)
    {
        shpBox box;
    // always put lock regions to the left amrgin box = lock->getBox();
        box.UL().X() = win_left_margin(curwin);
        box.alignPt().X() = box.UL().X();
        box.LR().X() = MAXL;
        lock->setBox(box);

lock->setTimeStamp(String(""));
        lock->setHandle(0);
        lock->setProtected(FALSE);
    }

/*******************************************************
```

39

```
            set bitmap in lock region

********************************************************/
         FSTATIC void setBitmap(Lock *lockregion, bool lock)
         {
                 class mc_dibitmap *my_bitmap;
                 if (lock)
                         my_bitmap = get_bitmap_from_resources("IDB_lockOS");
                 else
                         my_bitmap = get_bitmap_from_resources("IDB_lockOE");
            lockregion->what_bitmap = FALSE;
                 CharNum = get_mc_bitmap_width(my_bitmap);
                 lockregion->lockBitmap = new DisplayableBitmap(my_bitmap);

         }

/******************************************************* init lock region
         ********************************************************/
         Lock::Lock() : docRegion(&shpBox(shpPoint(0,0), shpPoint(0,0), shpPoint(0,0)))
         {
                 initLock(this);
                 my_doc = ((docDocument *)getParent());
         }

/*******************************************************

            init lock region and set bitmap

********************************************************/
         Lock::Lock(shpBox *b, bool new_lock, docDocument *doc) : docRegion(b)
         {
                 screw();
                 initLock(this);
                 lock = new_lock;
                 my_doc = doc;
                 setBitmap(this, lock);
         }

/******************************************************* destroy lock region(and endlock/startlock too)
            destroy lockbox too.

********************************************************/
         static bool rec = TRUE;
```

```
        Lock::~Lock()
        {
                LockBox *lockbox;

    //   first clear entire region
                shpLogical a,b,c,d;

a = myBox.UL().Y()-1;
                b = myBox.UL().X()-1;
                c = myBox.LR().Y()+1;
                d = myBox.LR().X()+1;
                doc_to_win(&a,&b);
                doc_to_win(&c,&d);
                dClearRegion(a,b,c,d);

//   find a lockbox
                lockbox = my_doc->my_doclocker.
                        findLockBox(myhandle);
                if (lockbox) {
                        if (getWhatLock()) {
                                if (lockbox->getEndLock()
                                        &&
                                        lockbox->getStartLock()
                                        && rec) {
                                        rec = FALSE;
    // delete ENDLOCK if we are deleting STARTLOCK
                                        my_doc->remove_region(
                                                lockbox->getEndLock());
                                }
                        }
                        else {
                                if (lockbox->getEndLock()
                                        &&
                                        lockbox->getStartLock()
                                        && rec) {
                                        rec = FALSE;
    // delete STARTLOCK if we are deleting ENDLOCK
                                        my_doc->remove_region(
                                                lockbox->getStartLock());
                                }
                        }
                        lockbox->setLockRegion(getWhatLock(), 0);
    // delele lockbox from document locker
                        my_doc->my_doclocker.removeLockedBox(myhandle);
                }
                rec = TRUE;
```

41

```
}
/******************************************************
*****************************************************/
static redraw = TRUE;
void Lock::show_main(mcGraphicsContext gc, int dm)
{
        shpPoint    pt(myBox.UL());
        shpBox      box = lockBitmap->getBox();
        shpBox      box1 = getBox();
        shpBox      tempbox;
        shpLogical  x1, y1;
        shpLogical  line;
        shpLogical  dummy;

ifdef NEVER if (!redraw)
       return;
   if (background) {
     if (McadAppPtr()->view_mode())
        restore_background();
           else
        change_background();
     redraw = FALSE;
     show(NULL, 0);
   }
#endif
        docRegion::clear();

if (getLocked() != what_bitmap) {
       delete lockBitmap;
       class mc_dibitmap *my_bitmap;

what_bitmap = getLocked();
       if (lock) {
         if (getLocked())
            my_bitmap = get_bitmap_from_resources("IDB_lockCS");
         else
            my_bitmap = get_bitmap_from_resources("IDB_lockOS");
       }
       else {
         if (getLocked())
            my_bitmap = get_bitmap_from_resources("IDB_lockCE");
         else
            my_bitmap = get_bitmap_from_resources("IDB_lockOE");
```

42

```
            }
            CharNum = get_mc_bitmap_width(my_bitmap);
            lockBitmap = new DisplayableBitmap(my_bitmap);
        }
        //  coords for writing timestamp
            x1 = CharNum + 3;
            y1 = lockBitmap->getExtent().Y() - 3;
        //  draw bitmap
            box.translate(pt);
            tempbox = box;
            doc_to_win(&tempbox.UL().Y(),&tempbox.UL().X());
            doc_to_win(&tempbox.LR().Y(),&tempbox.LR().X());
            lockBitmap->setBox(tempbox);
            lockBitmap->show(gc);

//  set cursor to write text
            clip_cursor(y1, x1);
            STRING((char *)getTimeStamp());

//  draw brown line
            dSetColor(colBROWN);
            line = box1.UL().Y();
            if (lock)
                    line += lockBitmap->getExtent().Y() - 2;
            else
                    line += 2;
            /* convert the line to a window coordinate */
            doc_to_win(&line, &dummy);
            dLine(
            line,
            lockBitmap->getExtent().X(),
            line, MAXL
            );

//  set color back to default
            dSetColor(colDEFAULT);

//  restore coords
            pt.Y() = -pt.Y();
            pt.X() = -pt.X();
            box.translate(pt);
            pt.X() = -pt.X();
            pt.Y() = -pt.Y();
            lockBitmap->setBox(box);
```

43

```
       #ifdef NEVER
               if (background) {
               if (McadAppPtr()->view_mode())
                       change_background();
               else
                       restore_background();
               }
               redraw = TRUE;
       #endif
       }

/*********************************************************

       *********************************************************/
       void Lock::edit(mc_command_type cmd, char *cmd_data, shpPoint cursor, int)
       {
       #ifdef NEVER
               shpBox  bx(shpPoint(0, 0),
                       lockBitmap->getExtent(),
                   shpPoint(0, 0));
               shpLogical save_x1;
25             shpLogical save_x2;

save_x1 = bx.LR().X();
               save_x2 = bx.UL().X();
               bx.LR().X() = MAXL;
               bx.UL().X() = win_left_margin(curwin);
               lockBitmap->setBox(bx);

mcAssert(getParent() && !strcmp(getParent()->getType(), "docDocument"));
       // add start and lock boxes
               if (myhandle == 0) {
                       if (lock)
                       myhandle =
                               ((docDocument *)getParent())->my_doclocker.
                               addLockedBox(myBox.LR(), myBox.LR());
40             else {
       // call resize for ENDLOCK region
                               myhandle =
                               ((docDocument *)getParent())->my_doclocker.
                                       getCurrentHandle();
45                             ((docDocument *)getParent())->my_doclocker.
                               resizeLockedBox(myhandle, myBox.UL(), lock);
                       }
                               ((docDocument *)getParent())->my_doclocker.
```

```
                                        44
                        setRegion(myhandle, lock, this);
                } updaterg(this, &bx);
5       // we need to resize lock area in case of
        // STARTLOCK region after updaterg
                if (lock)
                        ((docDocument *)getParent())->my_doclocker.
                                resizeLockedBox(myhandle, myBox.LR(), lock);
10              bx.LR().X() = save_x1;
                bx.UL().X() = save_x2;

lockBitmap->setBox(bx);
        #endif
        // if we enter region change a background
        #ifdef NEVER
                if (cmd == rENTER)
                        background = TRUE;
                else
                background = FALSE;
        #endif
                if (cmd == rENTER)
                        has_focus = TRUE;
                if(cmd == rLEAVE)
                {
                        has_focus = FALSE;
                        blankSolidSelectionBorder();
                }
                if(cmd == rCUTTING)
                {
                        return;
                }

        // redraw spouse region too if (this->getSpouse()) {
                this->getSpouse()->setBackground(background);
                                this->getSpouse()->show(NULL, 0);
                } show(NULL, 0);
        }

        /************************************************
                read/write functions
```

```
                                           45

/***********************************************************/
#define NOSPACE TRUE
define NOUNDERSCORE FALSE static bool got_first_lock = FALSE; // gma 7 Sept 1995 made static
void prepare_string_to(char *string, bool what_to_do)
{
// replace spaces by underscores
    mcAssert(string);

while(*string) {
        if (what_to_do) {
            if (*string == ' ')
                *string = '_';
        }
        else {
            if (*string == '_')
                *string = ' ';
        }
        string++;
    }
}

/*********************************************************** read function

***********************************************************/
mcBool    Lock::read(MCAD_FILE *name, bool j, bool& k)
{
    char *password = new char[RECLEN];
    char *timestamp_str = new char[RECLEN];
    bool      what_lock;
    bool      locked_reg;
    shpPoint  pt;
    char *buffer = new char[RECLEN];
    shpLogical save_x1;
    shpLogical save_x2;

// get string
    rdrec(name, buffer);
    sscanf(buffer, "%s %d %d %s", password, &what_lock,
                &locked_reg, timestamp_str);

// put spaces back if area is locked
    prepare_string_to(password, NOUNDERSCORE);
    prepare_string_to(timestamp_str, NOUNDERSCORE);
```

46

```
        // create bitmaps
           lock = what_lock;
           setBitmap(this, lock);

      // set right coords in bitmap
           shpBox  bx(shpPoint(0, 0),
                          lockBitmap->getExtent(),
                     shpPoint(0, 0));
           save_x1 = bx.LR().X();
           save_x2 = bx.UL().X();
           bx.LR().X() = MAXL;
           bx.UL().X() = win_left_margin(curwin);
           lockBitmap->setBox(bx);
           if (lock)
               pt = myBox.LR();
           else
               pt = myBox.UL();

if (my_doc == 0)
               my_doc = ((docDocument *)getParent());
           if (!got_first_lock) {
        // call addlockbox
               myhandle =
                      my_doc->my_doclocker.
                      addLockedBox(pt, pt);
                      got_first_lock = TRUE;
           }
           else {
        // call resize for ENDLOCK region
               myhandle =
                   my_doc->my_doclocker.
                          getCurrentHandle();
                   my_doc->my_doclocker.
                   resizeLockedBox(myhandle, pt, lock);
               got_first_lock = FALSE;
           }

// set region in lockbox
           my_doc->my_doclocker.
               setRegion(myhandle, lock, this);

// lock the area if you need to
           if (locked_reg) {
               if (String(password) == String(" "))
                   my_doc->my_doclocker.
                       lockArea(myhandle,
                              String(""), FALSE);
                   else
```

47

```
            my_doc->my_doclocker.
            lockArea(myhandle,
                           String(password), FALSE);
     //   set time stamp
            setTimeStamp(String(timestamp_str));
        }
        else {
            setTimeStamp(String(""));
        }
        updaterg(this, &bx);

// restore box
        bx.LR().X() = save_x1;
        bx.UL().X() = save_x2;
        lockBitmap->setBox(bx);

delete [RECLEN] password;
        delete [RECLEN] timestamp_str;
        delete [RECLEN] buffer;
        return TRUE;
     }

/*******************************************************
                write lock region

*******************************************************/
     bool Lock::write_main(MCAD_FILE *f, bool, bool& unparse_failed)
     { char *buffer = new char[RECLEN];
        String time_stamp = getTimeStamp();
        String password = getPassword().getEncodedString();
        if (getLocked()) {
     // replace spaces
            prepare_string_to((char *)time_stamp, NOSPACE);
            if (!getProtected())
                sprintf(buffer, "%s %d %d %s",
                        "_", lock , getLocked(),
                        (char *)time_stamp);
            else {
                prepare_string_to((char *)password, NOSPACE);
                sprintf(buffer, "%s %d %d %s",
                        (char *)password, lock , getLocked(),
                        (char *)time_stamp);
                prepare_string_to((char *)password, NOUNDERSCORE);
```

48

```
             }
      // put spaces back
             prepare_string_to((char *)timestamp, NOUNDERSCORE);
          }
      else {
             sprintf(buffer, "%s %d %d %s", "_", lock , getLocked(),
                             "_");

}
      // now we can write
       wrtrec(f, buffer);
       unparse_failed = FALSE;
       delete [RECLEN] buffer;
       return TRUE;
    }

/***************************************************** setPassword()
       *****************************************************/
      void     Lock::setPassword(String& string)
      {
             passwd.encodeString(string);
    }

/*****************************************************

             clear()

*****************************************************/
      void     Lock::clear(mcGraphicsContext gc)
      {
35           docRegion::clear(gc);
      }

      void Lock :: resync()
      {
             shpBox  bx(shpPoint(0, 0),
                     lockBitmap->getExtent(),
                 shpPoint(0, 0));
             shpLogical save_x1;
             shpLogical save_x2;
```

49

```
            save_x1 = bx.LR().X();
            save_x2 = bx.UL().X();
            bx.LR().X() = MAXL;
            bx.UL().X() = win_left_margin(curwin);
            lockBitmap->setBox(bx);
            if (myhandle == 0) {
                    if (lock)
                    myhandle =
                            ((docDocument *)getParent())->my_doclocker.
                            addLockedBox(myBox.LR(), myBox.LR());
                    else {
    // call resize for ENDLOCK region
                            myhandle =
                            ((docDocument *)getParent())->my_doclocker.
15                                  getCurrentHandle();
                            ((docDocument *)getParent())->my_doclocker.
                            resizeLockedBox(myhandle, myBox.UL(), lock);
                    }
                            ((docDocument *)getParent())->my_doclocker.
                            setRegion(myhandle, lock, this);
            }
            //updaterg(this, &bx);
        shpPoint pt = shpPoint(getBox().UL().X(), getBox().alignPt().Y());
            shpBox savebx = bx;
            savebx.align_to_point(pt);
            setBox(savebx);
    // we need to resize lock area in case of
    // STARTLOCK region after updaterg
            if (lock)
                    ((docDocument *)getParent())->my_doclocker.
                            resizeLockedBox(myhandle, myBox.LR(), lock);
            bx.LR().X() = save_x1;
            bx.UL().X() = save_x2;

            lockBitmap->setBox(bx);

}
```

Although the invention has been described with reference to a specific embodiment, this description is not meant to be construed in a limiting sense. Various modifications of the disclosed embodiment as well as alternative embodiments will be apparent to persons skilled in the art.

What is claimed is:

1. For use in a live mathematical document program executed on a computer processor, the live mathematical document program capable of editing and processing a live mathematical document, a system for locking a user defined portion of the live mathematical document, comprising:

an editor that facilitates entering mathematical expressions into the live mathematical document, said editor having:
 a command that designates an area in the live mathematical document;
 a command that disallows repositioning of the designated area; and
 a command that provides a locked area by disallowing editing of at least one expression within the designated area, thereby providing a non-editable expression; and
a routine that automatically updates the live mathematical document when an allowed edit occurs to ensure that said non-editable expression within the locked area is consistent with all expressions upon which said non-editable expression depends.

2. The system of claim 1 wherein the designated area is designated by a first boundary line and a second boundary line, each of which is visually represented by a separate horizontal line across the live mathematical document.

3. The system of claim 1 wherein the command that disallows editing also prompts creation of a visual display that indicates whether the expression is in the locked area.

4. The system of claim 1 further comprising a command that unlocks the locked area.

5. The system of claim 4 wherein a password is required to emoloy the command that unlocks the locked area.

6. The system of claim 1 wherein the editor further comprises a command for copying the expression in the locked area to a non-locked area of the live mathematical document.

7. The system of claim 1 further comprising:
a command for saving the live mathematical document to a secondary storage device; and
an algorithm for compressing the live mathematical document if the document includes at least one locked area.

8. The system of claim 2 further comprising a visual time display that indicates when the locked area was established.

9. For use in a live mathematical document program executed on a computer processor, the live mathematical document program capable of editing and processing a live mathematical document, the live mathematical document program enabling a user to enter mathematical expressions in any position in live mathematical document and automatically updating the live mathematical document to ensure that all expressions are consistent with all expressions upon which said expressions depend, a system for locking a defined portion of the live mathematical document, comprising:

means for positioning a first boundary line and a second boundary line in the live mathematical document, the first boundary line and the second boundary line each comprising a horizontal line across the live mathematical document;
means for locking an area on the live mathematical document, the locked area being the area between the first boundary line and the second boundary line; and
an editor for editing expressions in the live mathematical document, the editor including means for ascertaining whether an edit is within the locked area and means for disallowing edits within the locked area,
wherein expressions in the locked area are automatically updated by the live mathematical document program to ensure that all expressions in the live mathematical document are consistent with all expressions upon which said expressions depend.

10. The system of claim 9 further comprising means for unlocking the locked area.

11. The system of claim 9 wherein the means for locking further comprises means for providing password protection.

12. The system of claim 9 wherein the editor further comprises means for copying an expression in the locked area to a non-locked area of the live mathematical document.

13. The system of claim 9 wherein the means for positioning is user controlled and operatable only if the area between the first boundary line and the second boundary line is unlocked.

14. The system of claim 13 wherein the means for positioning further comprises means for grabbing and moving said boundary lines in a vertical direction.

15. For use in a live mathematical document program executed on a computer processor, the live mathematical document program capable of editing and processing a live mathematical document, the live mathematical document program enabling a user to enter mathematical expressions into the live mathematical document and automatically updating the live mathematical document to ensure that all expressions are consistent with all expressions upon which they depend, a system for locking a user defined portion of the live mathematical document, comprising:

means for positioning a boundary in the live mathematical document;
means for locking an area on the live mathematical document, the locked area being the area determined by the boundary; and
an editor for editing expressions in the live mathematical document, the editor including means for ascertaining whether an edit is within the locked area and means for disallowing edits within the locked area,
wherein expressions in the locked area are automatically updated by the live mathematical document program to ensure that all expressions in the live mathematical document are consistent with all expressions upon which said expressions depend.

16. The system of claim 15 further comprising means for unlocking the locked area.

17. The system of claim 15 wherein the means for locking further comprises means for providing password protection.

18. The system of claim 15 wherein the editor further comprises means for copying an expression in the locked area to a non-locked area of the live mathematical document.

19. A method for disallowing modification of a portion of a live mathematical document in which at least one expression is present, comprising the steps of:

in response to prompting by a user, positioning a first boundary adjacent to the portion of the document that contains the expression;
in response to prompting by the user, positioning a second boundary adjacent to the portion of the document that contains the expression so that the expression is disposed in an area defined between said first boundary and said second boundary;
locking the area defined by the first boundary and the second boundary so that the first boundary and the second boundary cannot be moved;

disallowing editing of the expression within the locked area; and automatically updating the live mathematical document when an allowed edit occurs to ensure that the non-editable expression within the locked area is consistent with all expressions upon which the non-editable expression depends.

20. The method of claim 19 further comprising the step of displaying the first boundary and the second boundary as separate horizontal lines that are displayed within the live mathematical document.

21. The method of claim 19 further comprising the step of unlocking the locked area in response to prompting by the user.

22. The method of claim 21 wherein the step of unlocking the area defined by the first boundary and the second boundary further comprises the step of requesting a password from the user.

23. The method of claim 19 further comprising the step of copying the expression in the locked area to a non-locked area of the live mathematical document in response to prompting by the user.

24. The method of claim 19 further comprising:

compressing the document by employing a compression algorithm if there is an expression in the locked area; and saving said compressed document to a secondary storage device.

25. The method of claim 19 further comprising the step of displaying a time stamp that indicates when the area defined by the first boundary and the second boundary was locked.

26. For use in a live mathematical document program executed on a computer processor, the live mathematical document program capable of editing and processing a live mathematical document, the live mathematical document program enabling a user to enter mathematical expressions in any position in live mathematical document and automatically updating the live mathematical document to ensure that all expressions are consistent with all expressions upon which said expressions depend, a method for locking a user defined portion of the live mathematical document, comprising:

positioning a first boundary line and a second boundary line in the live mathematical document, the first boundary line and the second boundary line each comprising a horizontal line across the live mathematical document;

locking an area on the live mathematical document, the locked area being the area between the first boundary line and the second boundary line; and editing expressions in the live mathematical document so that an edit that is within the locked area is disallowed.

27. For use in a live mathematical document program executed on a computer processor, the live mathematical document program capable of editing and processing a live mathematical document, the live mathematical document program enabling a user to enter mathematical expressions into the live mathematical document and automatically updating the live mathematical document to ensure that all expressions are consistent with all expressions upon which they depend, a method for locking a user defined portion of the live mathematical document, comprising:

positioning a boundary in the live mathematical document;

locking an area on the live mathematical document, the locked area being the area determined by the boundary; and enabling a user to edit expressions in the live mathematical document;

ascertaining whether an edit is within the locked area;

disallowing edits within the locked area;

allowing edits not within the locked area; and whenever an allowed edit occurs, automatically updating the live mathematical document to ensure that all expressions in the live mathematical document are consistent with all expressions upon which said expressions depend.

\* \* \* \* \*